(12) United States Patent
Ko et al.

(10) Patent No.: US 7,142,271 B2
(45) Date of Patent: Nov. 28, 2006

(54) METHOD OF FORMING A TRANSFLECTIVE LIQUID CRYSTAL DISPLAY DEVICE WITH WIDE-VIEWING ANGLE

(75) Inventors: Fu-Jen Ko, Hsinchu (TW); Yung-Hsun Wu, Yunghe (TW)

(73) Assignee: AU Optronics Corp., Hsinchu (TW)

( * ) Notice: Subject to any disclaimer, the term of this patent is extended or adjusted under 35 U.S.C. 154(b) by 116 days.

(21) Appl. No.: 10/659,699

(22) Filed: Sep. 11, 2003

(65) Prior Publication Data

US 2004/0080690 A1   Apr. 29, 2004

(30) Foreign Application Priority Data

Sep. 12, 2002   (TW) ................. 91120859 A

(51) Int. Cl.
*G02F 1/1343*   (2006.01)
*G02F 1/1337*   (2006.01)

(52) U.S. Cl. ................. 349/114; 349/129; 349/138

(58) Field of Classification Search ............. 349/114, 349/129

See application file for complete search history.

(56) References Cited

U.S. PATENT DOCUMENTS

| | | | |
|---|---|---|---|
| 6,620,655 B1 * | 9/2003 | Ha et al. ................... | 438/149 |
| 6,753,939 B1 * | 6/2004 | Jisaki et al. ................ | 349/114 |
| 6,819,379 B1 * | 11/2004 | Kubo et al. ................ | 349/114 |
| 6,853,427 B1 * | 2/2005 | Park et al. ................. | 349/129 |
| 6,864,945 B1 * | 3/2005 | Fujimori et al. ............ | 349/156 |
| 6,876,413 B1 * | 4/2005 | Liu ........................... | 349/113 |
| 6,919,945 B1 * | 7/2005 | Ha ............................. | 349/114 |
| 6,924,876 B1 * | 8/2005 | Kubo et al. ................ | 349/193 |
| 6,927,820 B1 * | 8/2005 | Jang et al. ................. | 349/114 |
| 2001/0017679 A1 | 8/2001 | Ha et al. | |
| 2001/0048496 A1 * | 12/2001 | Baek ......................... | 349/114 |
| 2002/0003596 A1 | 1/2002 | Kim | |
| 2002/0036732 A1 | 3/2002 | Kim | |
| 2002/0080320 A1 * | 6/2002 | Suzuki et al. .............. | 349/153 |
| 2002/0085152 A1 | 7/2002 | Chuang et al. | |
| 2002/0113927 A1 | 8/2002 | Ha et al. | |
| 2003/0128315 A1 * | 7/2003 | Tashiro et al. ............. | 349/113 |
| 2003/0128317 A1 * | 7/2003 | Ohmuro et al. ............ | 349/113 |
| 2004/0169810 A1 * | 9/2004 | Fujimori et al. ............ | 349/156 |
| 2005/0001960 A1 * | 1/2005 | Kim et al. .................. | 349/114 |

(Continued)

OTHER PUBLICATIONS

Liu et al "LP-5: A novel design Wide View Angle Partially Reflective Super Multi-domai Homeotropically Aligned LCD", SID '02, May 2002, pp. 558-561.*

*Primary Examiner*—Andrew Schechter
(74) *Attorney, Agent, or Firm*—Rabin & Berdo, P.C.

(57) ABSTRACT

A method of forming a transflective liquid crystal display device with a wide-viewing angle. An insulating layer having an uneven surface is formed on a first substrate. An opening is formed in the insulating layer. A conformal reflective electrode is formed on a sidewall and a bottom of the opening and partial insulating layer. The reflective electrode has an opaque portion and a transparent portion, and the transparent portion is located in the opening. At least one symmetric protruding element is formed on the insulating layer around the reflective electrode. A first alignment film is formed on the reflective electrode and the symmetric protruding element. A common electrode and a second alignment film are sequentially formed on an inner surface of a second substrate. Negative type liquid crystal molecules added with chiral agent fill in a space between the first and second substrates to form a liquid crystal layer.

15 Claims, 3 Drawing Sheets

U.S. PATENT DOCUMENTS

2005/0117098 A1 * 6/2005 Kurasawa .................... 349/114
2005/0134771 A1 * 6/2005 Kim et al. ................... 349/114
2005/0146658 A1 * 7/2005 Kim et al. ................... 349/114

* cited by examiner

METHOD OF FORMING A TRANSFLECTIVE LIQUID CRYSTAL DISPLAY DEVICE WITH WIDE-VIEWING ANGLE

BACKGROUND OF THE INVENTION

1. Field of the Invention

The present invention relates to a method of forming a transflective liquid crystal display device, and more particularly, to a method of forming a transflective liquid crystal display device with a wide-viewing angle.

2. Description of the Related Art

Liquid crystal display (LCD) devices are been widely used for display devices, such as a portable televisions and notebook computers. Liquid crystal display devices are classified into two types. One is a transmission type liquid crystal display device using a backlight as a light source, and another is the reflective type liquid crystal display device using an external light source, such as sunlight or an indoor lamp. It is difficult to decrease the weight, the volume, and the power consumption of the transmission type LCD due to the power required by the backlight component. The reflective type LCD has the advantage of not requiring a backlight component, but it cannot operate without an external light source.

In order to overcome the drawbacks of these two types of LCDs, a transflective LCD device which can operate as both a reflective and transmission type LCD is disclosed in U.S. Pub. No. 2002/0003596. The transflective LCD device has a reflective electrode in a pixel region, wherein the reflective electrode has a transmissive portion. Thus, the transflective LCD device has lower power consumption in comparison with the conventional transmission type LCD device because a backlight component is not used when there is a bright external light. Further, in comparison with the reflective type LCD device, the transflective LCD device has the advantage of operating as a transmission type LCD device using backlight when no external light is available.

In general, the conventional transflective LCD devices use TN (Twisted Nematic) type liquid crystal molecules or MTN (Mixed mode TN) type liquid crystal molecules. The biggest drawback of the TN/MTN mode LCD device is, however, its narrow viewing angle. Thus, the conventional transflective LCD device has a gray scale inversion problem under transmission mode, thereby degrading display quality.

SUMMARY OF THE INVENTION

The object of the present invention is to provide a method of forming a transflective liquid crystal display device.

Another object of the present invention is to provide a method of forming a transflective liquid crystal display device with a wide-viewing angle.

Yet another object of the present invention is to provide a method of forming a transflective liquid crystal display device with a continuous domain in each pixel thereof, which can provide a wide viewing angle.

In order to achieve these objects, the present invention provides a method of forming a transflective liquid crystal display device with a wide-viewing angle. A first substrate and a second substrate opposite the first substrate are provided. An insulating layer having an uneven surface is formed on the first substrate. At least one opening is formed in the insulating layer. A conformal pixel electrode is formed on a sidewall and a bottom of the opening and part of the insulating layer, wherein the pixel electrode has at least one opaque (reflective) portion (hereinafter "reflective electrode"), and at least one transparent portion (hereinafter "transparent electrode") located in the opening. At least one protruding element is formed on the insulating layer located around the reflective electrode. A conformal first alignment film is formed on the reflective electrode and the protruding element. A common electrode is formed on an inner surface of the second substrate. A second alignment film is formed on the common electrode. Negative type liquid crystal molecules added with a chiral agent are filled in a space between the first substrate and the second substrate to form a liquid crystal layer.

The present invention improves on the prior art in that an asymmetric electric field can be induced at the fringe portion of the reflective electrode and the transparent electrode is located in the opening, which allows negative type liquid crystal molecules added with a chiral agent to tilt and have different molecular alignment when an electric field above a threshold value is present. Moreover, the protrusion formed around the reflective electrode can enhance molecules to tilt. Thus, a continuous domain is formed in a pixel, thereby increasing the viewing angle of a transflective LCD.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1A:
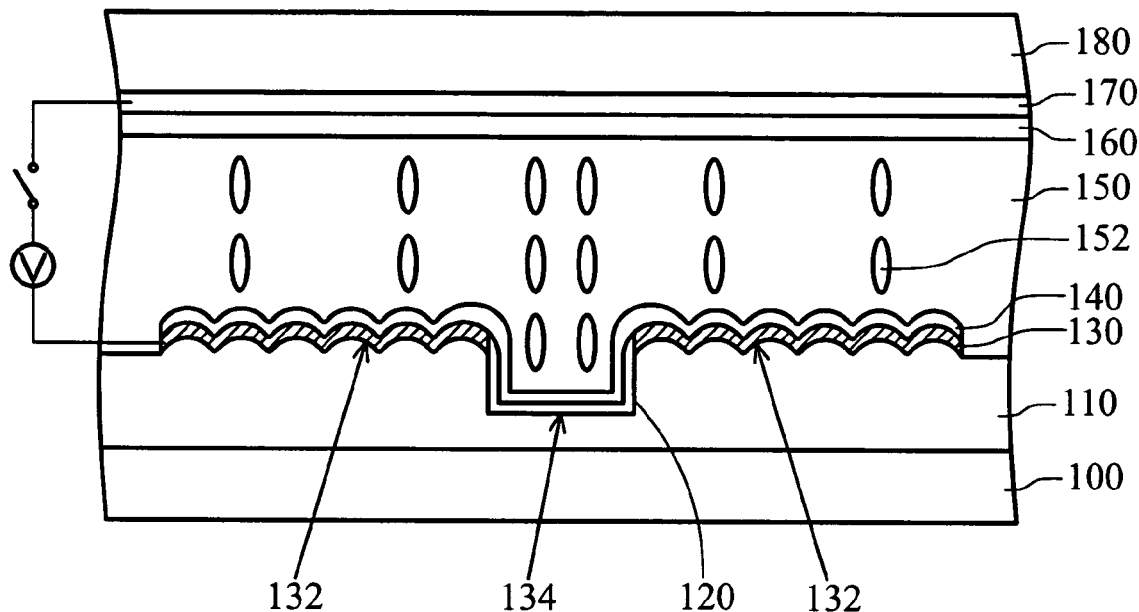
FIG. 1A is a sectional view according to a first embodiment of the present invention while no external electric field is present.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 1B:
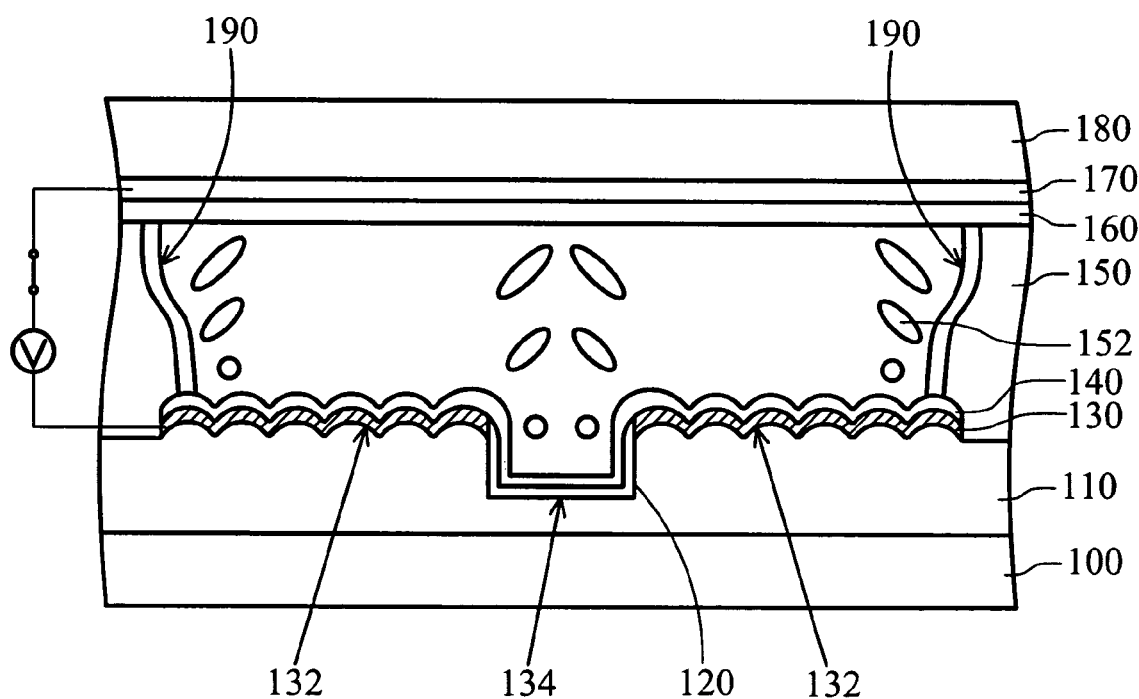
FIG. 1B is a sectional view according to a first embodiment of the present invention while an electric field is present.
Figure 3:
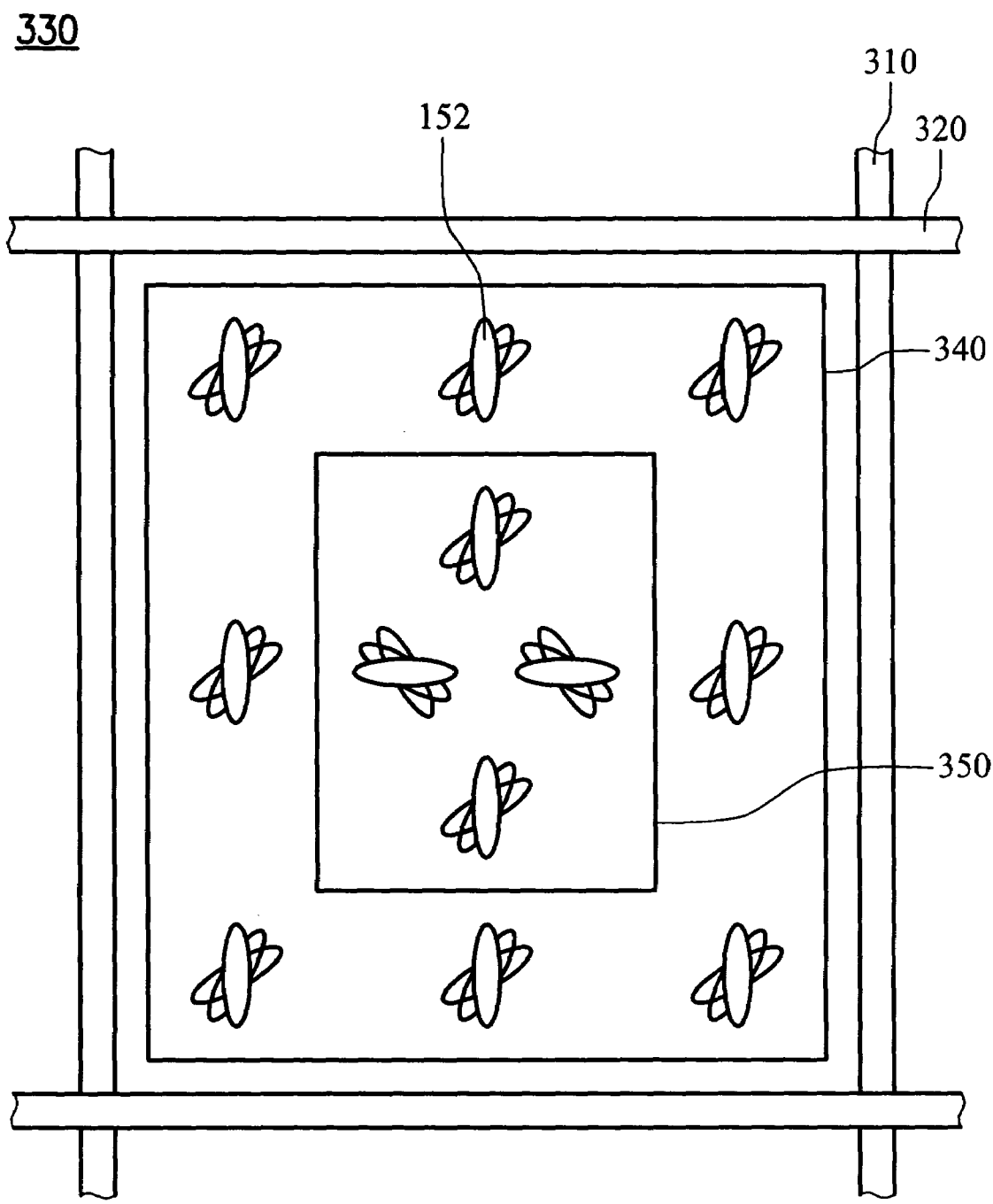
FIG. 3 is a top view showing the alignment of the liquid crystal molecules in one of the pixels of the transflective LCD device according to FIGS. 1B and 2B while an electric field is applied thereto.

FIG. 1A is a sectional view according to the first embodiment of the present invention while no external electric field is present. FIG. 1B is a sectional view according to a first embodiment of the present invention while an electric field is present. FIG. 3 is a top view showing the alignment of the liquid crystal molecules in one of the pixels of the transflective LCD device according to FIG. 1B while an electric field is applied thereto. In order to simplify the illustration, only one pixel cell is shown in FIGS. 1A, 1B and 3.

In FIGS. 1A and 1B, a first substrate 100 is provided. The first substrate 100 can be a glass panel having a thin film transistor array. The first substrate 100 is a light transmitting substrate so that light from a backlight (not shown) can penetrate the first substrate 100. Then, a transparent insulating layer 110 having an uneven surface is formed on the first substrate 100. The transparent uneven insulating layer 110 can be a silicon oxide (SiOx) layer, a silicon nitride (SiN$_x$) layer, or a photosensitive resin layer formed by deposition or spin-coating and partial etching. Next, at least one opening 120 is formed in the insulating layer 110.

In FIGS. 1A and 1B, a conformal pixel electrode 130 is formed on a sidewall and a bottom of the opening 120 and part of the insulating layer 110, wherein the pixel electrode 130 has at least one opaque portion (which is a relective electrode) 132 and at least one transparent portion (or transparent electrode) 134. The transparent electrode 134 is located in the opening 120. The reflective electrode 132 can be an aluminum layer formed by sputtering, and the transparent electrode 134 can be an ITO (indium tin oxide) layer or an IZO (indium zinc oxide) formed by sputtering. As a demonstrative example, a layer of ITO is formed in the transparent electrode 134 before or after forming a layer of aluminum in the reflective electrode 132. The ITO layer (serving as the transparent electrode) is connected to the Al layer (serving as the reflective electrode) and functions to apply a pixel voltage at the transparent electrode 134.

In FIGS. 1A and 1B, a conformal first alignment film 140 is formed on the pixel electrode 130. It should be noted that it is not necessary to perform a rubbing treatment on the first alignment film 140.

In FIGS. 1A and 1B, a common electrode 170, such as an ITO layer, is formed on an inner surface of the second substrate 180. The second substrate 180 can be a glass panel having a color filter. The second substrate 180 is a light transmitting substrate. Then, a second alignment film 160 is formed on the common electrode 170. It should be noted that it is not necessary to perform a rubbing treatment on the second alignment film 160.

In FIGS. 1A and 1B, negative type liquid crystal molecules 152 added with a chiral agent fills in a space between the first substrate 100 and the second substrate 180 to form a liquid crystal layer 150, and a transflective LCD is thus obtained.

In FIG. 1A, when no pixel voltage (V) is present (or applied) or the pixel voltage is lower than a threshold value, the negative type liquid crystal molecules 152 are vertically aligned between the substrates 100 and 180 constituting the liquid crystal layer 150, thereby being a Normally Black state and enhancing the contrast in the reflective mode. In addition, the chiral agent makes the negative type liquid crystal molecules 152 have a twisting light property during an electric field is present, as shown as FIG. 1B. Moreover, the chiral agent causes the negative type liquid crystal molecules 152 to be stably disposed on the uneven surface of the reflective electrode 132.

FIG. 1B shows the state of the negative type liquid crystal molecules inside the LCD when a pixel voltage (V) above a threshold value is applied between the pixel electrode 130 and the common electrode 170. Since the periphery of the pixel electrode 130 has a section (or drop), an asymmetric electric field 190 occurs at a fringe portion of the pixel electrode 130. The asymmetric electric field 190 allows the negative type liquid crystal molecules 152 added with the chiral agent to tilt and have different molecular alignment. Also, the negative type liquid crystal molecules 152 added with the chiral agent located around the opening 120 tilt toward the middle portion of the opening 120 due to a physical force (gravity effect). Hence, within the same pixel of the transflective LCD according to the invention, the molecules 152 have different molecular alignment (that is, many domains) so that the viewing angle of the transflective LCD is increased.

As shown in FIG. 3, a single pixel structure 330 has a gate line 310 and a data line 320 around the periphery of a reflective area 340 including a transmissive area 350, wherein the reflective area 340 corresponds to the reflective electrode 132 in FIG. 1B and the transmissive area 350 corresponds to the transparent electrode 134 in FIG. 1B. Orientation of the liquid crystal molecules 152 inside each pixel changes to display an image by employing an active device (such as a thin film transistor, not shown). In FIG. 3, the liquid crystal molecules 152 added with chiral agent according to the invention has a twisting light property and a continuous domain having different molecular alignment, thereby increasing the viewing angle of the transflective LCD.

Second Embodiment

Figure 2A:
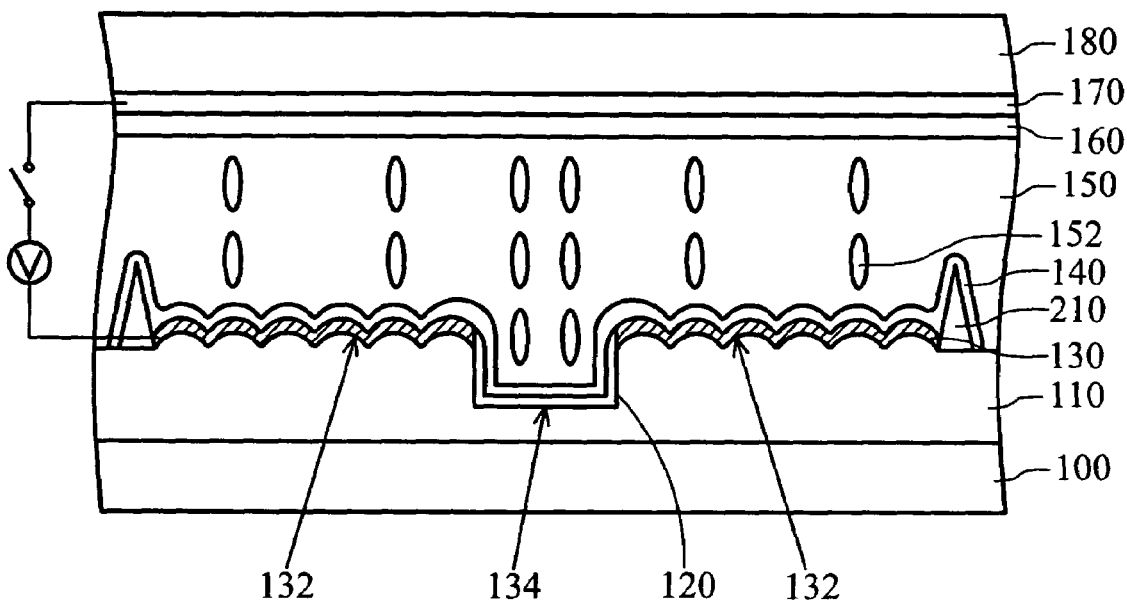
FIG. 2A is a sectional view according to a second embodiment of the present invention while no external electric field is present.
Figure 2B:
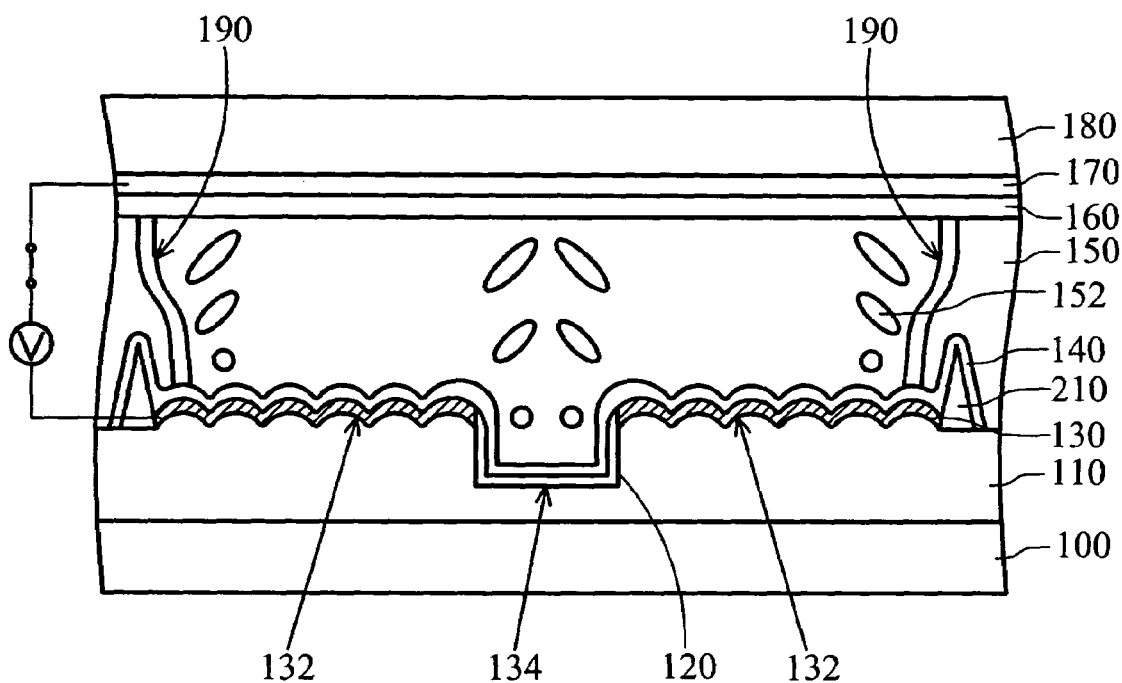
FIG. 2B is a sectional view according to a second embodiment of the present invention while an electric field is present.

FIG. 2A is a sectional view according to a second embodiment of the present invention while no external electric field is present. FIG. 2B is a sectional view according to a second embodiment of the present invention while an electric field is present. FIG. 3 is a top view showing the alignment of the liquid crystal molecules in one of the pixels of the transflective LCD device according to FIG. 2B while an electric field is applied thereto. In order to simplify the illustration, only one pixel cell is shown in FIGS. 2A, 2B and 3.

In FIGS. 2A and 2B, a first substrate 100 is provided. The first substrate 100 can be a thin film transistor array included glass panel. The first substrate 100 is a light transmitting substrate so that light from a backlight (not shown) can penetrate the first substrate 100. Then, a transparent insulating layer 110 having an uneven surface is formed on the first substrate 100. The uneven transparent insulating layer 110 can be a silicon oxide (SiOx) layer, a silicon nitride (SiN$_x$) layer, or a photosensitive resin layer formed by deposition or spin-coating and partial etching. Next, at least one opening 120 is formed in the insulating layer 110.

In FIGS. 2A and 2B, a conformal pixel electrode 130 is formed on a sidewall and a bottom of the opening 120 and part of the insulating layer 110, wherein the pixel electrode 130 has at least one opaque portion (reflective electrode) 132 and at least one transparent portion (transparent electrode) 134. The transparent electrode 134 is located in the opening 120. The reflective electrode 132 can be an aluminum layer formed by sputtering, and the transparent electrode 132 can be an ITO (indium tin oxide) or IZO (indium zinc oxide) layer formed by sputtering. As a demonstrative example, a layer of ITO (serving as the transparent electrode) 134 before or after forming a layer Al to be the reflective electrode 132. The ITO layer is connected to the Al layer and functions to apply a pixel voltage at the transparent electrode 134.

In FIGS. 2A and 2B, at least one symmetric protruding element 210 is formed on the insulating layer 110 located around the periphery of the pixel electrode 130. The symmetric protruding element 210 preferably has a triangular cross-section.

In FIGS. 2A and 2B, a conformal first alignment film 140 is formed on the pixel electrode 130 and the symmetric protruding element 210. It should be noted that it is not necessary to perform a rubbing treatment on the first alignment film 140.

In FIGS. 2A and 2B, a common electrode 170, such as an ITO layer, is formed on an inner surface of the second substrate 180. The second substrate 180 can be a glass panel having a color filter. The second substrate 180 is a light transmitting substrate. Then, a second alignment film 160 is formed on the common electrode 170. It should be noted that it is not necessary to perform a rubbing treatment on the second alignment film 160.

In FIGS. 2A and 2B, negative type liquid crystal molecules 152 added with a chiral agent fills in a space between the first substrate 100 and the second substrate 180 to form a liquid crystal layer 150, and a transflective LCD is thus obtained.

In FIG. 2A, when no pixel voltage (V) is present (or applied) or the pixel voltage is lower than a threshold value, the negative type liquid crystal molecules 152 are vertically aligned between the substrates 100 and 180 constituting the liquid crystal layer 150, thereby a Normal Black state occurs enhancing the contrast in the reflective mode. In addition, the chiral agent causes the negative type liquid crystal molecules 152 to have a twisting light property when an electric field is present, as shown as Fig. 2B. Moreover, the chiral agent causes the negative type liquid crystal molecules 152 to be stably disposed on the uneven surface of the reflective electrode 132.

FIG. 2B shows the state of the negative type liquid crystal molecules inside the LCD when a pixel voltage (V) above a threshold value is applied between the pixel electrode 130 and the common electrode 170. Since the periphery of the pixel electrode 130 has a section (or drop) and a protrusion 210, an asymmetric electric field 190 occurs at a fringe portion of the pixel electrode 130. The asymmetric electric field 190 allows the negative type liquid crystal molecules 152 added with the chiral agent to tilt and have different molecular alignment. Moreover, the liquid crystal molecules 152 near the protrusion 210 are tilted in a specific direction due to the local effect of the protrusion 210. Also, the negative type liquid crystal molecules 152 added with the chiral agent located around the opening 120 tilt toward the middle portion of the opening 120 due to a physical force of gravity. Hence, within the same pixel of the transflective LCD according to the invention, the molecules 152 have different molecular alignment (that is, many domains) so that the viewing angle of the transflective LCD is increased.

As shown in FIG. 3, a single pixel structure 330 has a gate line 310 and a data line 320 around the periphery of a reflective area 340 including a transmissive area 350, wherein the reflective area 340 corresponds to the reflective electrode 132 in FIG. 2B and the transmissive area 350 corresponds to the transparent electrode 134 in FIG. 2B. Orientation of the liquid crystal molecules 152 inside each pixel changes to display an image by employing an active device (such as a thin film transistor, not shown). In FIG. 3, the liquid crystal molecules 152 added with chiral agent according to the invention has a twisting light property and a continuous domain having different molecular alignment, thereby increasing the viewing angle of the transflective LCD.

Thus, the present invention provides a method of forming a transflective liquid crystal display device with a wide-viewing angle. The present method utilizes an asymmetric electric field occurring at the fringe portion of the pixel electrode and the opening located at the transparent electrode, causing the negative type liquid crystal molecules added with a chiral agent to tilt and have different molecular alignment. Moreover, the protrusion formed around the pixel electrode enhances molecule tilt. Thus, a continuous domain is formed in each pixel, thereby widening the viewing angle of a transflective LCD.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of forming a transflective liquid crystal display device with a wide-viewing angle, comprising the steps of:

providing a first substrate and a second substrate opposite the first substrate;

forming an insulating layer having an uneven first surface, and a second surface opposite the first surface, the second surface on the first substrate;

etching only partially through the insulating layer from the first surface to form at least one opening in the insulating layer, the opening having a bottom surface in the insulating layer spaced above the second surface;

forming a conformal transparent electrode on a sidewall and a bottom of the opening and a reflective electrode on part of the insulating layer, wherein the sidewall and bottom of the opening are covered only by the transparent electrode;

forming a conformal first alignment film on the reflective electrode;

forming a common electrode on an inner surface of the second substrate;

forming a second alignment film on the common electrode; and filling a space between the first substrate and the second substrate with negative type liquid crystal molecules added with a chiral agent to form a liquid crystal layer.

2. The method according to claim 1, further comprising the step of:

forming at least one symmetric protruding element on the insulating layer located around the reflective electrode.

3. The method according to claim 2, wherein the symmetric protruding element has a triangular cross-section.

4. The method according to claim 1, wherein, when a voltage is applied between the reflective electrode and the common electrode, an asymmetric electric field occurs at a fringe portion of the reflective electrode.

5. The method according to claim 1, wherein the opaque portion of the reflective electrode is an aluminum layer.

6. The method according to claim 1, wherein the transparent electrode is an ITO (indium tin oxide) layer.

7. The method according to claim 1, wherein a rubbing treatment is not performed on the first alignment film.

8. The method according to claim 1, wherein a rubbing treatment is not performed on the second alignment film.

9. A method of widening a viewing angle of a transflective liquid crystal display device, comprising the steps of:

providing a first substrate and a second substrate opposite the first substrate;

forming a transparent insulating layer having an uneven surface on the first substrate;

forming at least one opening in the insulating layer;

forming a conformal transparent electrode on a sidewall and a bottom of the opening and a reflective electrode on part of the insulating layer, wherein the transparent electrode is located in the opening;

forming at least one symmetric protruding element on the insulating layer located around the reflective electrode;

forming a conformal first alignment film on the reflective electrode and the symmetric protruding element;

forming a common electrode on an inner surface of the second substrate;

forming a second alignment film on the common electrode; and filling a space between the first substrate and the second substrate with negative type liquid crystal molecules added with a chiral agent to form a liquid crystal layer.

10. The method according to claim 9, wherein the symmetric protruding element has a triangular cross-section.

11. The method according to claim 9, wherein, when a voltage is applied between the reflective electrode and the common electrode, an asymmetric electric field occurs at a fringe portion of the reflective electrode.

12. The method according to claim 9, wherein the opaque portion of the reflective electrode is an aluminum layer.

13. The method according to claim 9, wherein the transparent electrode is an ITO (indium tin oxide) layer.

14. The method according to claim 9, wherein a rubbing treatment is not performed on the first alignment film.

15. The method according to claim 9, wherein a rubbing treatment is not performed on the second alignment film.

* * * * *